United States Patent
Ling et al.

(10) Patent No.: US 11,610,026 B2
(45) Date of Patent: Mar. 21, 2023

(54) MODULE AND METHOD FOR AUTHENTICATING DATA TRANSFER BETWEEN A STORAGE DEVICE AND A HOST DEVICE

(71) Applicant: FLEXXON PTE. LTD., Singapore (SG)

(72) Inventors: Chan Mei Ling, Singapore (SG); Nizar Bouguerra, Singapore (SG)

(73) Assignee: Flexxon PTE. LTD., Singapore (SG)

( * ) Notice: Subject to any disclaimer, the term of this patent is extended or adjusted under 35 U.S.C. 154(b) by 0 days.

(21) Appl. No.: 17/575,221

(22) Filed: Jan. 13, 2022

(65) Prior Publication Data

US 2022/0382918 A1   Dec. 1, 2022

(51) Int. Cl.
  *G06F 21/79* (2013.01)
  *G06F 21/44* (2013.01)
  *G06F 21/60* (2013.01)
  *H04L 9/08* (2006.01)

(52) U.S. Cl.
  CPC ............ *G06F 21/79* (2013.01); *G06F 21/44* (2013.01); *G06F 21/602* (2013.01); *H04L 9/0825* (2013.01)

(58) Field of Classification Search
  CPC ........ G06F 21/79; G06F 21/44; G06F 21/602; H04L 9/0825; H04L 9/3239; H04L 9/3247; H04L 9/50; H04L 63/0442; H04L 63/126; H04L 63/1466; H04L 63/0876
  See application file for complete search history.

(56) References Cited

U.S. PATENT DOCUMENTS

| | | | |
|---|---|---|---|
| 7,255,270 B2 | 8/2007 | Kwon et al. | |
| 7,284,082 B2 | 10/2007 | Greenberger | |
| 8,762,789 B2 | 6/2014 | Lund et al. | |
| 8,812,860 B1 | 8/2014 | Bray | |
| 9,270,683 B2 | 2/2016 | Coughlin et al. | |
| 9,948,467 B2 | 4/2018 | King | |
| 2003/0196080 A1* | 10/2003 | Karman | H04L 63/045 713/150 |
| 2005/0268328 A1* | 12/2005 | Corliano | H04L 65/1101 726/3 |
| 2011/0107105 A1* | 5/2011 | Hada | H04L 63/08 713/176 |
| 2017/0264600 A1* | 9/2017 | Froelicher | H04L 63/0823 |
| 2018/0309581 A1* | 10/2018 | Butler | H04W 12/069 |

* cited by examiner

*Primary Examiner* — Abiy Getachew
(74) *Attorney, Agent, or Firm* — Kanika Radhakrishnan; Evergreen Valley Law Group (57) ABSTRACT

This document describes a module and method for authenticating data transfer between a storage device and a host device. The module is configured to allow encrypted data to be exchanged between the storage device and the host device once the module has verified that the storage device has been correctly paired with an authorized host device whereby the verification step does not require a password to be manually entered or an additional external device to be attached.

14 Claims, 6 Drawing Sheets

MODULE AND METHOD FOR AUTHENTICATING DATA TRANSFER BETWEEN A STORAGE DEVICE AND A HOST DEVICE

FIELD OF THE INVENTION

This invention relates to a module and method for authenticating data transfer between a storage device and a host device. The module is configured to allow encrypted data to be exchanged between the storage device and the host device once the module has verified that the storage device has been correctly paired with an authorized host device whereby the verification step does not require a password to be manually entered or an additional external device to be attached.

SUMMARY OF PRIOR ART

Storage devices typically comprise of solid state devices (SSDs), hard disk drives (HDDs), optical drives or a magnetic disc drives. Regardless whether the storage device comprises just-a-bunch-of-flash (JBOF), disk drives or SSDs, the host device is typically required to specify the logical block addresses (LBAs) and/or physical address blocks (PABs) that are to be accessed/modified in the storage device in order to access the information associated with the LBAs.

In order to gain access to content in a storage device, malicious third parties will typically connect the storage device to a host device and through the use of hacking algorithms or software, attempt to gain access to the information stored within the storage device. Typically, such storage devices would be protected at the software level, e.g. the operating system, through the use of usernames and passwords whereby a set of data contained within the storage device would be locked to a particular user and only the administrator of the software would have full access to all the data contained within the storage device.

However, when the administrator and/or the user keys in their password to gain access to the storage device, they will be vulnerable to man-in-the-middle type of attacks whereby their keystrokes and/or inputs may be recorded and transmitted to third parties. The malicious third party may then replay the commands thereby gaining access to the content of the storage device.

Instead of keying in passwords, those skilled in the art have proposed that an external security device, e.g. a USB drive, that contains the password (to allow the host device to access the storage device) be plugged into the host device and/or storage device each time the storage device is to be accessed. The relevant device will then automatically retrieve the password from the external device and use the password contained therein to gain access to the storage device.

Unfortunately, each time when the password is being utilized, it too will be vulnerable to man-in-the-middle types of attacks as malicious actors may monitor the transfer of data at the computer bus interfaces, e.g. Serial ATA/PCIe buses, and copy this information before the data is encrypted within the storage device and/or host device. The copied password may then be used to gain access to the content in the storage device.

For the above reasons, those skilled in the art are constantly striving to come up with a module and method that is capable of authenticating data transfer between a storage device and a host device without the need for passwords to be manually entered and/or without the need for external devices to be plugged in each time access to the storage device is required.

SUMMARY OF THE INVENTION

The above and other problems are solved and an advance in the art is made by systems and methods provided by embodiments in accordance with the invention.

A first advantage of embodiments of modules and methods in accordance with the invention is that the module is immune to man-in-the-middle type of attacks as passwords do not need to be entered and external security devices do not need to be plugged in each time the storage device is to be accessed.

A second advantage of embodiments of modules and methods in accordance with the invention is that the module is able to pair a storage device with a host device and once paired, only secure communication may take place between the storage device and the host device.

A third advantage of embodiments of modules and methods in accordance with the invention is that throughout the use of the paired device, the module will randomly carry out proof of possession checks to confirm that the storage device remains paired with the appropriate hardware.

A fourth advantage of embodiments of modules and methods in accordance with the invention is that once the storage device has been paired with a host hardware, this unique pairing will have to be maintained in order for data to be exchanged between the paired devices.

The above advantages are provided by embodiments of a module and/or method in accordance with the invention operating in the following manner.

According to a first aspect of the invention, a module for authenticating data transfer between a storage device and a host device is disclosed, the module comprising a processing unit; and a non-transitory media readable by the processing unit, the media storing instructions that when executed by the processing unit cause the processing unit to: generate a digital signature for the storage device and the host device based on a unique number associated with the storage device and a unique device identity associated with the host device; determine if the digital signature has been written into a blockchain; allow encrypted data transfer between the storage device and the host device when it is determined that the digital signature matches a digital signature written into the blockchain; or prevent data transfer between the storage device and the host device when it is determined that the digital signature does not match a digital signature written into the blockchain.

With regard to the first aspect of the invention, the instruction to prevent data transfer between the storage device and the host device further comprises instructions that when executed by the processing unit cause the processing unit to: write the digital signature into the blockchain when a pairing instruction is received from an authorized application provided in the host device; and allow encrypted data transfer between the storage device and the host device when the digital signature has been written into the blockchain.

With regard to the first aspect of the invention, the module further comprises instructions that when executed by the processing unit cause the processing unit to: generate, after a random period of time has passed, another digital signature for the storage device and the host device based on the unique number associated with the storage device and the unique device identity associated with the host device;

determine if the another digital signature matches with the digital signature that has been written into the blockchain; allow encrypted data transfer between the storage device and the host device when it is determined that the another digital signature matches the digital signature written into the blockchain; or prevent data transfer between the storage device and the host device when it is determined that the another digital signature does not match the digital signature written into the blockchain.

With regard to the first aspect of the invention, the instructions to generate the digital signature comprises instructions for directing the processing unit to generate the digital signature based on a session key of a Pretty-Good-Privacy (PGP) hybrid cryptosystem.

With regard to the first aspect of the invention, the instructions to allow encrypted data transfer between the storage device and the host device comprises instructions for directing the processing unit to: encrypt, using public-key cryptography, the PGP session key; store the encrypted PGP session key in secure locations at the storage device and the host device; and encrypt all data exchanged between the storage device and the host device using the PGP session key.

With regard to the first aspect of the invention, the instructions to generate the digital signature comprises instructions for directing the processing unit to: hash a combination of the unique number associated with the storage device and the unique device identity associated with the host device to generate a hashed message h; converting, using a Boneh-Lynn-Shacham (BLS) signature scheme, the hashed message h into a BLS signature $\sigma$; and using the BLS signature a as the digital signature.

With regard to the first aspect of the invention, the module further comprises instructions that when executed by the processing unit cause the processing unit to: receive, from an authorized application provided in the host device, restricted logical block addresses (LBAs); intercept instructions from the host device to access the restricted LBAs; and allow the intercepted instructions to access to the restricted LBAs when the instructions have been validated by the module, wherein the instructions are signed by the authorized application using a public key of the storage device and are validated by the module using a private key of the storage device.

With regard to the first aspect of the invention, the unique number associated with the storage device is provided within a secure crypto-processor in the storage device.

With regard to the first aspect of the invention, the blockchain comprises a private distributed database system provided within the host device.

According to a second aspect of the invention, a method for authenticating data transfer between a storage device and a host device comprises the steps of: generating, using a module, a digital signature for the storage device and the host device based on a unique number associated with the storage device and a unique device identity associated with the host device; determining, using the module, if the digital signature has been written into a blockchain; allowing, using the module, encrypted data transfer between the storage device and the host device when it is determined that the digital signature matches a digital signature written into the blockchain; or preventing, using the module, data transfer between the storage device and the host device when it is determined that the digital signature does not match a digital signature written into the blockchain.

With regard to the second aspect of the invention, the step of preventing data transfer between the storage device and the host device further comprises the steps of: writing, using the module, the digital signature into the blockchain when a pairing instruction is received from an authorized application provided in the host device; and allowing, using the module, encrypted data transfer between the storage device and the host device when the digital signature has been written into the blockchain.

With regard to the second aspect of the invention, the method further comprises the steps of: generating, using the module, after a random period of time has passed, another digital signature for the storage device and the host device based on the unique number associated with the storage device and the unique device identity associated with the host device; determining, using the module, if the another digital signature matches with the digital signature that has been written into the blockchain; allowing, using the module, encrypted data transfer between the storage device and the host device when it is determined that the another digital signature matches the digital signature written into the blockchain; or preventing, using the module, data transfer between the storage device and the host device when it is determined that the another digital signature does not match the digital signature written into the blockchain.

With regard to the second aspect of the invention, the step of generating the digital signature comprises generating the digital signature based on a session key of a Pretty-Good-Privacy (PGP) hybrid cryptosystem.

With regard to the second aspect of the invention, the step of allowing encrypted data transfer between the storage device and the host device comprises the steps of: encrypting, using the module and using public-key cryptography, the PGP session key; storing, using the module, the encrypted PGP session key in secure locations at the storage device and the host device; and encrypting, using the module, all data exchanged between the storage device and the host device using the PGP session key.

With regard to the second aspect of the invention, the step of generating the digital signature comprises the steps of: hashing, using the module, a combination of the unique number associated with the storage device and the unique device identity associated with the host device to generate a hashed message h; converting, using the module and using a Boneh-Lynn-Shacham (BLS) signature scheme, the hashed message h into a BLS signature $\sigma$; and using the BLS signature $\sigma$ as the digital signature.

With regard to the second aspect of the invention, the method further comprises the steps of: receiving, using the module, from an authorized application provided in the host device, restricted logical block addresses (LBAs); intercepting, using the module, instructions from the host device to access the restricted LBAs; and allowing, using the module, the intercepted instructions to access to the restricted LBAs when the instructions have been validated by the module, wherein the instructions are signed by the authorized application using a public key of the storage device and are validated by the module using a private key of the storage device.

With regard to the second aspect of the invention, wherein the unique number associated with the storage device is provided within a secure crypto-processor in the storage device.

With regard to the second aspect of the invention, wherein the blockchain comprises a private distributed database system provided within the host device.

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to a module and method for authenticating data transfer between a storage device and a host device. The module is configured to allow encrypted data to be exchanged between the storage device and the host device once the module has verified that the storage device has been correctly paired with an authorized host device whereby the verification step does not require a password to be manually entered or an additional external device to be attached. If the module determines that the storage device and the host device are to be paired for the first time, the module will generate a digital signature based on unique identifiers of the storage device and the host device whereby this digital signature is then stored on a blockchain so that it may not be altered or changed.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processor architectures. In embodiments of the invention, a module may also comprise computer instructions, firmware or executable code that may instruct a computer processor to carry out a sequence of events based on instructions received. The choice of the implementation of the modules is left as a design choice to a person skilled in the art and does not limit the scope of this invention in any way.

An exemplary process or method for authenticating data transfer between a storage device and a host device in accordance with embodiments of the invention is set out in the steps below. The steps of the process or method as implemented by a module provided at the storage device and/or the host device are as follows:

Step 1: generate a digital signature for the storage device and the host device based on a serial number associated with the storage device and a unique device identity associated with the host device;

Step 2: determine if the digital signature has been written into a blockchain;

Step 3: allow encrypted data transfer between the storage device and the host device when it is determined that the digital signature matches a digital signature written into the blockchain; and Step 4: prevent data transfer between the storage device and the host device when it is determined that the digital signature does not match a digital signature written into the blockchain.

In accordance with embodiments of the invention, the steps set out above may be carried out or executed by a module provided either at the host device and/or at the storage device.

Figure 1:
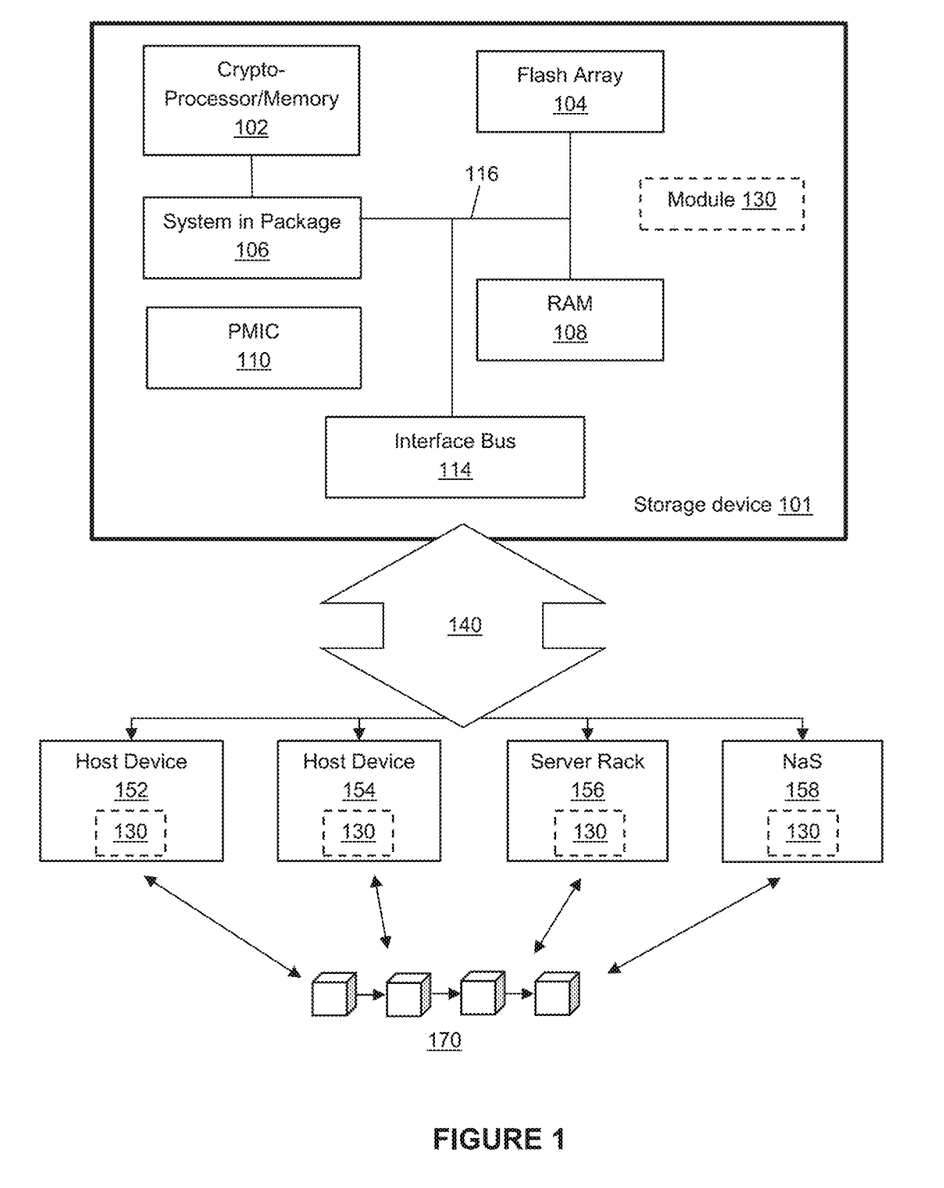
FIG. 1 illustrating a block diagram of a system for authenticating data transfer between a storage device and a host device in accordance with embodiments of the invention.

A block diagram of a system for authenticating data transfer between a storage device and a host device in accordance with embodiments of the invention is illustrated in FIG. 1. FIG. 1 illustrates storage device 101, host devices 152 and 154, server rack 156 and network attached storage (NaS) 158 whereby host devices 152 and 154, server rack 156 and NaS 158 are communicatively connected to blockchain 170 through wired and/or wireless means. Although FIG. 1 only illustrates host devices, a server rack and a NAS, one skilled in the art will recognize that any other types of computing devices/systems may be used without departing from the invention, as long as the computing device is able to support an operating system.

As illustrated in FIG. 1, connector 140 is illustrated as the intermediary between storage device 101 and host devices 152 and 154, server rack 156 and NaS 158 whereby all communication exchanged with storage device 101 will first have to pass through connector 140. Although the subsequent description only makes reference to a single host device, one skilled in the art will recognize that similar functions and/or processes may be performed by any of host devices 152 and 154, server rack 156 and NaS 158 without departing from the invention and that the host device is selected by way of example.

As illustrated in FIG. 1, module 130 may be provided at storage device 101 and/or at any host device without departing from this invention. In operation, when storage device 101 is initially connected to host device 152, storage device 101 will be powered by host device 152. Once powered on, module 130 will then extract from storage device 101 a unique serial number associated with storage device 101 and a public key. In embodiments of the invention, this unique serial number is stored in secure crypto-processor 102 while the public key may be stored in any unsecured location within memory 112.

Module 130 will also cause host device 152, which is preloaded with an operating system, to provide a unique device identifier and a public key associated with host device 152. In embodiments of the invention, the unique device identifier may be generated by an authorized application installed within an operating system of host device 152. This authorized application, which may comprise an embedded application, may also be used to generate a pairing instruction that is used to trigger the pairing of storage device 101 and host device 152.

As this is the first time that storage device 101 is to be paired with host device 152, when host device 152 provides its unique device identifier and the public key associated with host device 152, host device 152 will also provide the pairing instruction to module 130.

Upon receiving the required information from storage device 101 and host device 152, module 130 will initiate the pairing of these two devices by generating a digital signature for these two devices based on the serial number associated with storage device 101 and the unique device identifier associated with host device 152.

In an embodiment of the invention, the digital signature is generated as a session key for a Pretty-Good-Privacy (PGP) hybrid cryptographic algorithm. The unique digital signature is then subsequently written into blockchain 170. When required, a search may then be conducted on the blockchain to detect whether the unique digital signature has been written on to the blockchain.

In a further embodiment of the invention, the PGP session key may be treated as a message, m, which is then signed using a Boneh-Lynn-Shacham (BLS) signature scheme. In the BLS scheme, message m is hashed to produce hashed message, h. The BLS signature, σ, is then generated as $\sigma = h^x$, where x comprises the private key of device 101 or 152 (e.g. the unique identifier of devices 101 and 152 respectively). This unique digital signature comprising the BLS signature, σ, is then subsequently written into blockchain 170. It should be noted that the BLS signature, σ, may be verified using the public BLS key of the device that was used to generate the BLS signature, e.g. the public key of device 101 or 152 respectively.

In a continuation of this embodiment of the invention, all subsequent data transfers that take place between storage device 101 and host device 152 will then be encrypted based on the PGP hybrid cryptosystem whereby each device's public keys will be used as each device's public PGP keys. In embodiments of the invention, the data transfer will typically be initiated by module 130 as module 130 has to provide the session key to the other device so that the other device may decrypt the cipher text and subsequently use the session key to generate the cipher text.

For example, when data is to be sent from storage device 101 to host device 152, whether through P2P methods of communications and/or conventional method of data transfer, module 130 will first encrypt the data using the session key to form cipher text. The session key is then encrypted using host device 152's public key. Module 130 then causes the public key-encrypted session key to be transmitted along with the cipher text to host device 152. Upon receiving the public key-encrypted session key and the cipher text, host device 152 then uses its own private key to recover the session key. The recovered session key is then used by host device 152 to decrypt the cipher text into conventional text. The recovery of the session key and the decryption of the cipher text may all take place within a secure location provided within host device 152.

As host device 152 now has in its possession the session key and as the public key of storage device 101 is known to host device 152, when data is to be sent from host device 152 to storage device 101, host device 152 will first encrypt the received data using the session key to form cipher text. The session key is then encrypted using storage device 101's public key. Host device 152 then causes the public key-encrypted session key to be transmitted along with the cipher text to storage device 101 where it is intercepted by module 130. Upon receiving the public key-encrypted session key and the cipher text, module 130 then uses storage device 101's private key to recover the session key. In other embodiments of the invention, as the session key is already stored within module 130, module 130 may use the existing session key to directly decrypt the cipher text into conventional text without having to decrypt the public key-encrypted session key first. The decrypted text is then forwarded onto storage device 101 for further processing.

For completeness, in another example, module 130 is provided within host device 152. As such, when data is to be sent from host device 152 to storage device 101, module 130 will first encrypt the data using the session key to form cipher text. The session key is then encrypted using storage device 101's public key. Module 130 then causes the public key-encrypted session key to be transmitted along with the cipher text to storage device 101. Upon receiving the public key-encrypted session key and the cipher text, storage device 101 then uses its own private key to recover the session key. The recovered session key is then used by storage device 101 to decrypt the cipher text into conventional text. The recovery of the session key and the decryption of the cipher text may all take place within a secure location (such as crypto-memory 102) provided within storage device 101.

As storage device 101 now has in its possession the session key and as the public key of host device 152 is known to storage device 101, when data is to be sent from storage device 101 to host device 152, storage device 101 will first encrypt the received data using the session key to form cipher text. The session key is then encrypted using host device 152's public key. Storage device 101 then causes the public key-encrypted session key to be transmitted along with the cipher text to host device 152 where it is intercepted by module 130. Upon receiving the public key-encrypted session key and the cipher text, module 130 then uses host device 152's private key to recover the session key. In other embodiments of the invention, as the session key is already stored within module 130, module 130 may use the existing session key to directly decrypt the cipher text into conventional text without having to decrypt the public key-encrypted session key first. The decrypted text is then forwarded onto host device 152 for further processing.

In another embodiment of the invention, the digital signature is generated as a Boneh-Lynn-Shacham (BLS) signature based on the BLS cryptographic signature scheme whereby the serial number associated with storage device 101 is used as the private key of device 101 while the unique device identifier associated with host device 152 is used as the private key of device 152. In this embodiment, the message, m, to be signed using the BLS signature scheme may comprise, but is not limited to, a combination of the private keys of devices 101 and 152 or a hash of the private key of device 101 with the private key of device 152, to produce hashed message, h. The BLS signature, σ, is then generated as $\sigma = h^x$, where x comprises the private key of device 101 or 152. This unique digital signature comprising the BLS signature, σ, is then subsequently written into blockchain 170. It should be noted that the BLS signature, σ, may be verified using the public BLS key of the device that was used to generate the BLS signature, e.g. the public key of device 101 or 152 respectively.

All subsequent data transfers that take place between storage device 101 and host device 152 will then be encrypted based on existing cryptographic algorithms such as the PGP hybrid cryptosystem, symmetric encryption schemes and/or asymmetric encryption schemes and/or may be signed using the BLS signature scheme.

In a further embodiment of the invention, module 130 may, after a random and/or pre-determined period of time has passed, generate another digital signature (based on either of the embodiments above) for storage device 101 and host device 152 based on the serial number associated with storage device 101 and the unique device identifier associated with host device 152. Module 130 will then perform a check on the blockchain to determine if the newly generated digital signature may be found on the blockchain. If a match is found, this would imply that the two devices have been paired before and as such, encrypted data exchange may still take place between these two devices. Conversely, if a match is not found, this all data transfers between the two devices would then be halted.

In yet another embodiment of the invention, the digital signature may be generated using any cryptographic scheme such as, but is not limited to, asymmetric cryptography, symmetric cryptography, signing algorithms, key generation algorithms, signature verifying algorithms, digital signature schemes and/or any combination of these schemes.

With reference to FIG. 1, it is useful to note that storage device 101 comprises power management chipset (PMIC) 110, secure crypto-processor/memory 102, System in Package (SIP) 106, flash array 104 and Random-Access-Memory (RAM) 108 and interface bus 114. Flash array 104 and RAM 108 are connected to secure crypto-processor/memory 102, controller 106 and interface bus 114 through communication bus 116.

Flash array 104 may comprise any type of electronic non-volatile computer memory storage medium that can be electronically erased and reprogrammed such as NAND or NOR flash memories. Interface bus 114 acts as the physical interface between a host device and storage device 101 whereby existing storage standards and interfaces such as, but not limited to, small computer system interface (SCSI) protocol, serial advanced technology attachment (SATA) protocol, serial attached SCSI (SAS), Non-Volatile Memory express (NVMe), Peripheral Component Interconnect express (PCIe), NVMe over Fabric (NVME-oF), Network attached Storage (NAS) protocol or any similar interface may be used as the link for communicatively connecting storage device 101 to a host device such as a computer.

SIP 106 is a complex embedded system with standalone processing and works with firmware and modules contained within SIP 106 to manage all aspects of storage device 101, including protecting and controlling content stored in flash array 104, RAM 108 and secure crypto-processor/memory 102. This controller is most commonly implemented as a SoC (System-On-Chip) design which consists of multiple hardware-accelerated functional blocks/modules that are coupled to one or more embedded processor cores.

Secure crypto-processor/memory 102 comprises a dedicated chip/microprocessor for carrying out cryptographic operations and is usually embedded within tamper resistance packaging. Its main function is to act as the keystone of a security subsystem and it only outputs encrypted data once the external environment has been secured and established. PMIC 110 comprises a power management chipset which obtains its power directly from the host device's power source. As such, it can be said that storage device 101 will only be "powered on" once storage device 101 has been connected to a host device.

One skilled in the art will recognize that the various memory components described above comprise non-transitory computer-readable media and shall be taken to comprise all computer-readable media except for a transitory, propagating signal. Typically, the instructions are stored as program code in the memory components but can also be hardwired.

The detailed workings of blockchain 170 are omitted for brevity as it is known to one skilled in the art. In embodiments of the invention, blockchain 170 may comprise a decentralized distributed database system in which all nodes of the blockchain network are anonymous and all participate in the maintenance of the blockchain. In other embodiments of the invention, blockchain 170 may comprise a private distributed database system that is provided within any one of host devices 152, 154, server rack 156 and/or NaS 158.

Figure 2:
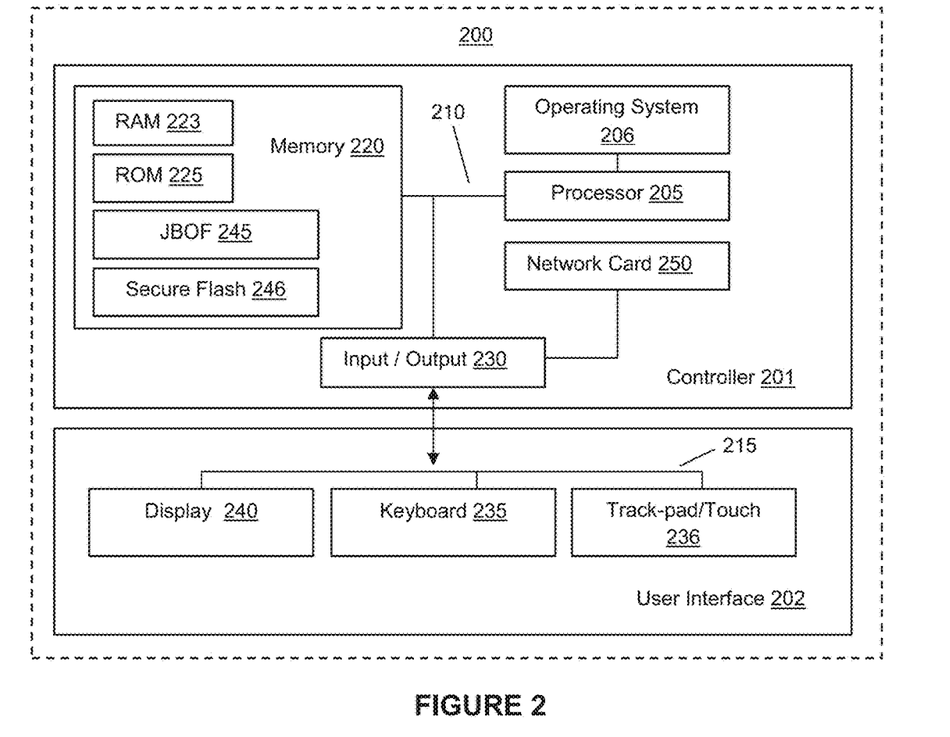
FIG. 2 illustrating a block diagram representative of processing systems providing embodiments in accordance with embodiments of the invention.

In accordance with embodiments of the invention, a block diagram representative of components of processing system 200 that may be provided within host devices 152, 154, server rack 156, NaS 158 and/or any computing device/human interface device with an operating system for implementing embodiments in accordance with embodiments of the invention is illustrated in FIG. 2. One skilled in the art will recognize that the exact configuration of each processing system provided within these modules/devices may be different and the exact configuration of processing system 200 may vary and FIG. 2 is provided by way of example only.

In embodiments of the invention, each of the human interface devices, host devices 152, 154, server rack 156 and/or NaS 158 may comprise controller 201 and user interface 202. User interface 202 is arranged to enable manual interactions between a user and each of these modules as required and for this purpose includes the input/output components required for the user to enter instructions to provide updates to each of these modules. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, processor 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from these modules via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and Just-a-bunch-of-flash (JBOF) 245, the last comprising one or more solid-state drives (SSDs). Memory 220 also includes secure flash 246 for securely storing secret keys, or private keys. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device, system on chip (SOC), field-programmable gate array (FPGA), SOC+FPGA, Application-Specific Integrated Circuit (ASIC) or other computational device. That is, processor 205 may be provided by any suitable logic circuitry for receiving inputs, processing them in accordance with instructions stored in memory and generating outputs (for example to the memory components or on display 240). In this embodiment, processor 205 may be a single core or multi-core processor with memory addressable space. In one example, processor 205 may be multi-core, comprising—for example—an 8 core CPU. In another example, it could be a cluster of CPU cores operating in parallel to accelerate computations.

Figure 3:
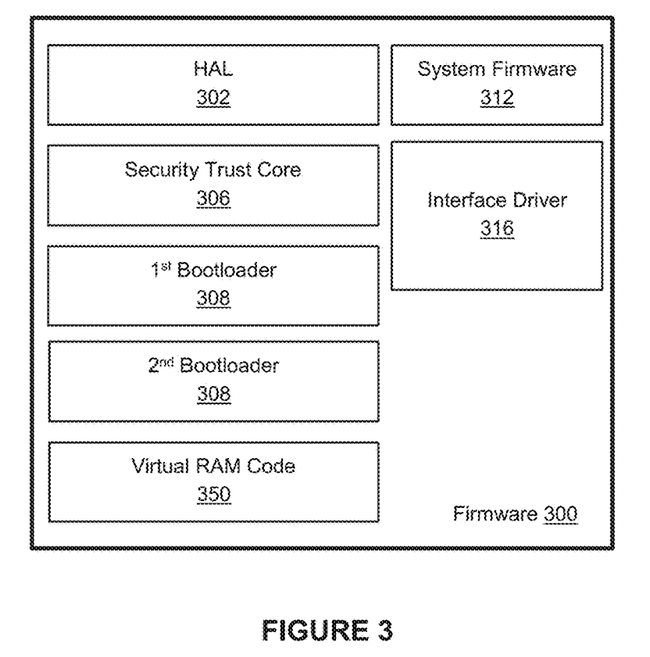
FIG. 3 illustrating a block diagram of modules contained within a firmware of a storage device in accordance with embodiments of the invention.

FIG. 3 illustrates a block diagram of multiple modules that may be found within a firmware of a storage device in accordance with embodiments of the invention. The modules within firmware 300 allow firmware 300 to work with any type of host device and/or operating system. Hardware abstraction layer (HAL) 302 comprises a low level driver for all System-on-Chip peripherals and Application-Specific Integrated Circuits (ASIC) to allow a computer's operating system to interact with the storage device at a general or abstract level rather than at a detailed hardware level. Security trust core 306 is a module that is configured to handle certificates and to carry out on-the-fly encryption and/or decryption processes. Firmware 300 also includes first-stage bootloader 308 which may comprise a read only memory (ROM), second-stage bootloader 308 comprising a secure bootloader, system firmware 312 and interface driver 316 to allow the firmware to communicate with the communication buses of various devices. Virtual RAM code 350 is also provided within firmware 300. The detailed workings of these modules are omitted for brevity as it is known to those skilled in the art. One skilled in the art will recognize that firmware 300 may comprise any combination of these modules and it is left as a design choice to one skilled in the art.

Figure 4:
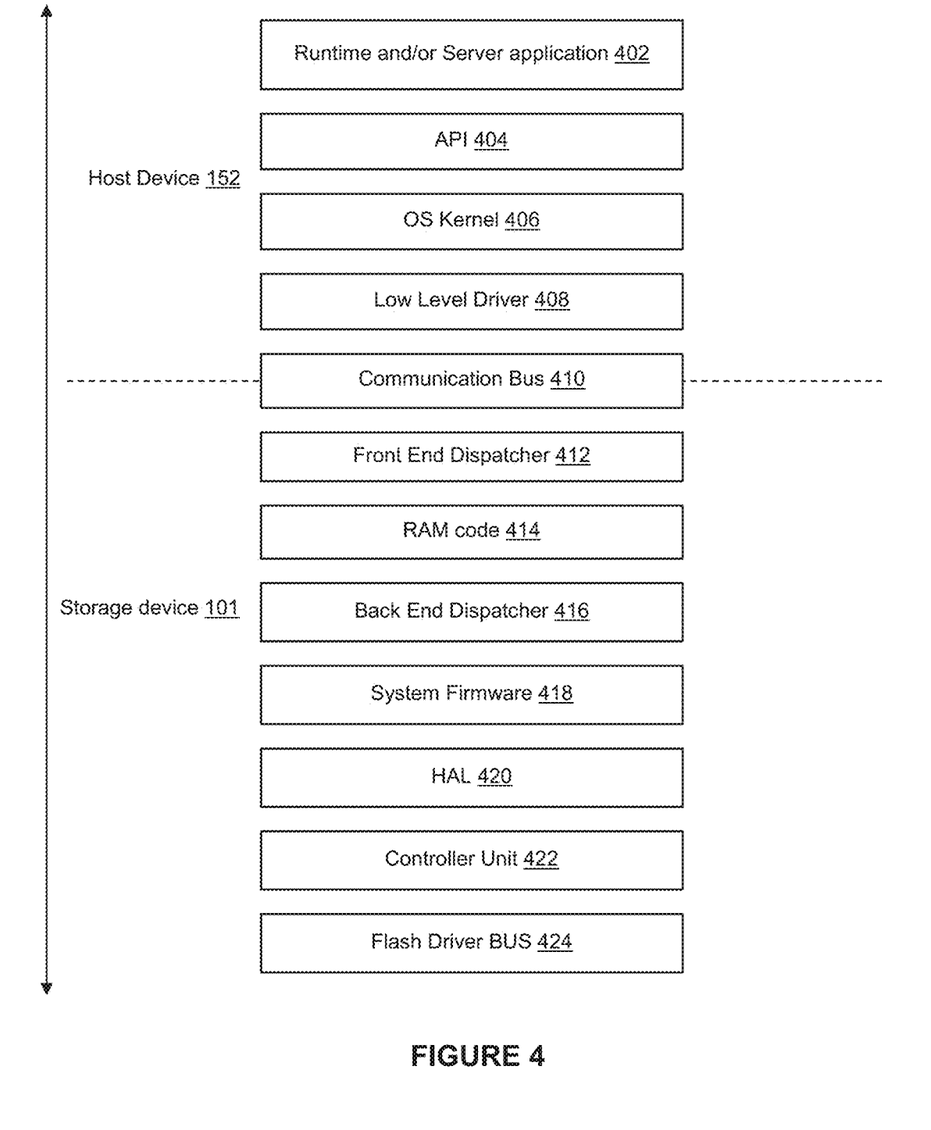
FIG. 4 illustrating a flow diagram of a process for accessing restricted logical block addresses (LBAs) in a storage device in accordance with embodiments of the invention.

FIG. 4 illustrates a flow diagram of a process for accessing restricted logical block addresses (LBAs) in storage device 101 in accordance with embodiments of the invention. In this embodiment of the invention, it is assumed that module 130 is provided at storage device 101 and that it has been determined that encrypted data transfer is to be allowed between host device 152 and storage device 101.

A user of host device 152 may then utilize an application programming interface (API) 404 of authorized application 402 to select a list of LBAs that re to be restricted. Depending on the type of OS 406 running on host device 152, an appropriate driver will be selected from low level driver 408 and will be used to communicate the list of restricted LBAs through communication bus 410 to storage device 101.

Upon receiving this list of restricted LBAs, module 130 will then provide the list to front end dispatcher 412. Front end dispatcher 412 will parse the list and assign tag numbers to each of the restricted LBAs. RAM code 414 then retrieves information about the tag numbers to determine if the LBA has been placed in a protected area and if it is meant to be moved into a protected area, RAM code 414 will then move the LBA into a protected area whereby it may only be access by validated instructions from the host device. RAM code 414 then updates all block stripes, and system tables (including the flash translation layer for SSDs), to migrate the restricted LBA's to a protected area, whereby all block stripes relating to these data files will be marked using one byte table. RAM code 414 does all this with the help of back end dispatcher 416, firmware 418, HAL 420, controller 422 and flash driver BUS 424.

Once this is done, the list of restricted LBAs are then provided to module 130. Module 130 is then configured to intercept any instructions from host device 152 to access the restricted LBAs. Module 130 will then only allow the intercepted instructions to access to the restricted LBAs when the instructions have been validated by module 130. In embodiments of the invention, the instructions will be validated when it is determined that the instructions were signed by the authorized application using a public key of the storage device and are validated by the module using a private key of the storage device.

Figure 5:
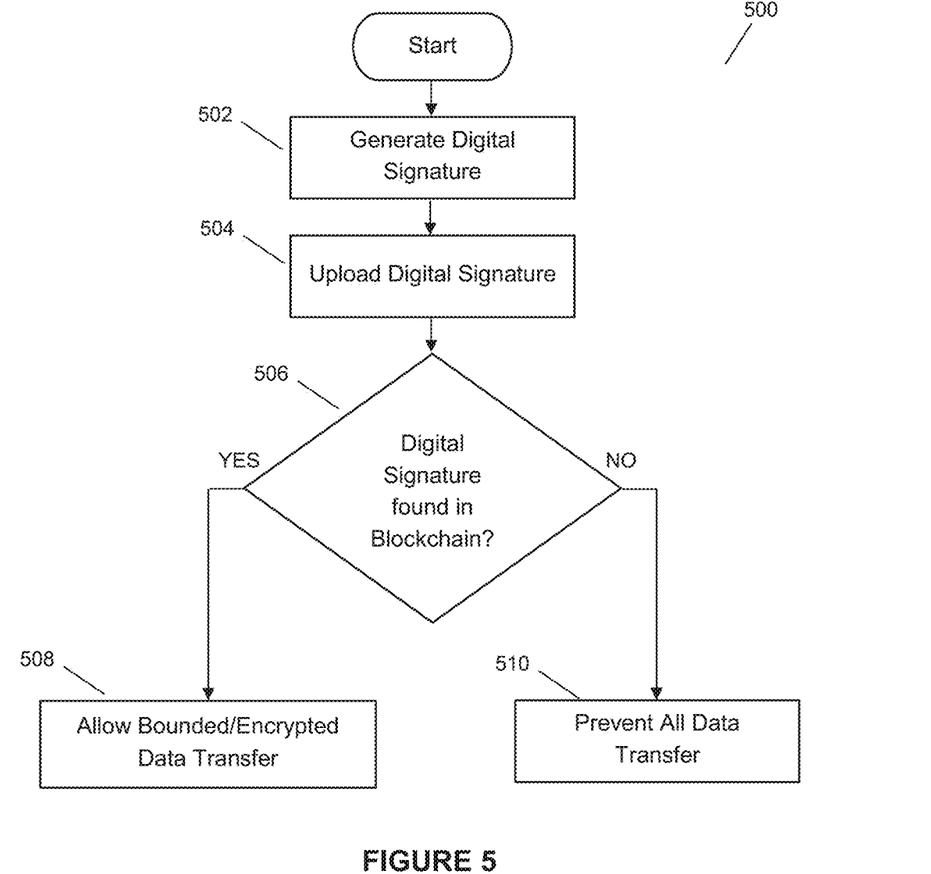
FIG. 5 illustrating a flow chart of a process or a method for authenticating data transfer between a storage device and a host device in accordance with embodiments of the invention.

FIG. 5 illustrates process 500 for authenticating data transfer between a storage device and a host device in accordance with embodiments of the invention whereby process 500 may be implemented in module 130 as provided in either the storage device and/or the host device.

Process 500 begins at step 502 whereby process 500 will generate a digital signature based on a unique serial number associated with the storage device and a unique device identifier associated with the host device. The generation of the digital signature at this step is as described in the previous sections above. At step 504, process 500 then uploads the digital signature into the blockchain. Process 500 then checks at step 506 whether the digital signature is found in a blockchain. If process 500 determines that the digital signature is found in the blockchain, it will proceed to allow all encrypted/bounded data transfers to take place between the storage device and the host device at step 508. Conversely, it will proceed to step 510 if process 500 determines that the digital signature is not found in the blockchain. At this step, allow all data transfers will not be allowed to take place between the storage device and the host device.

Figure 6:
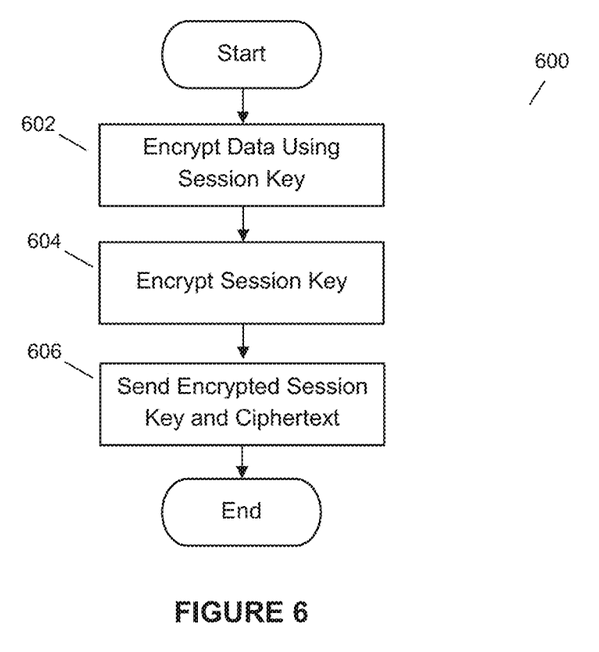
FIG. 6 illustrating a flow chart of a process or a method for sending encrypted data between the storage device and the host device in accordance with embodiments of the invention.

FIG. 6 illustrates process 600 for sending encrypted data from module 130 to another paired device when the PGP hybrid cryptosystem is used in accordance with embodiments of the invention. In this embodiment, the digital signature comprises a PGP session key that was generated based on the unique serial number of the storage device and the unique device identifier of the host device. Process 600 begins at step 602 whereby the generated session key is used to encrypt data that is to be sent to the paired device. At step 604, process 600 then proceeds to encrypt the session key using the public key of the paired device. The public-key encrypted session key and the cipher text are then sent to the paired device at step 606. For completeness, it should be noted that upon receiving the public-key encrypted session key and the cipher text, the paired device may then decrypt the session key using its own private key and the decrypted session key may then be used to decrypt the cipher text.

Figure 7:
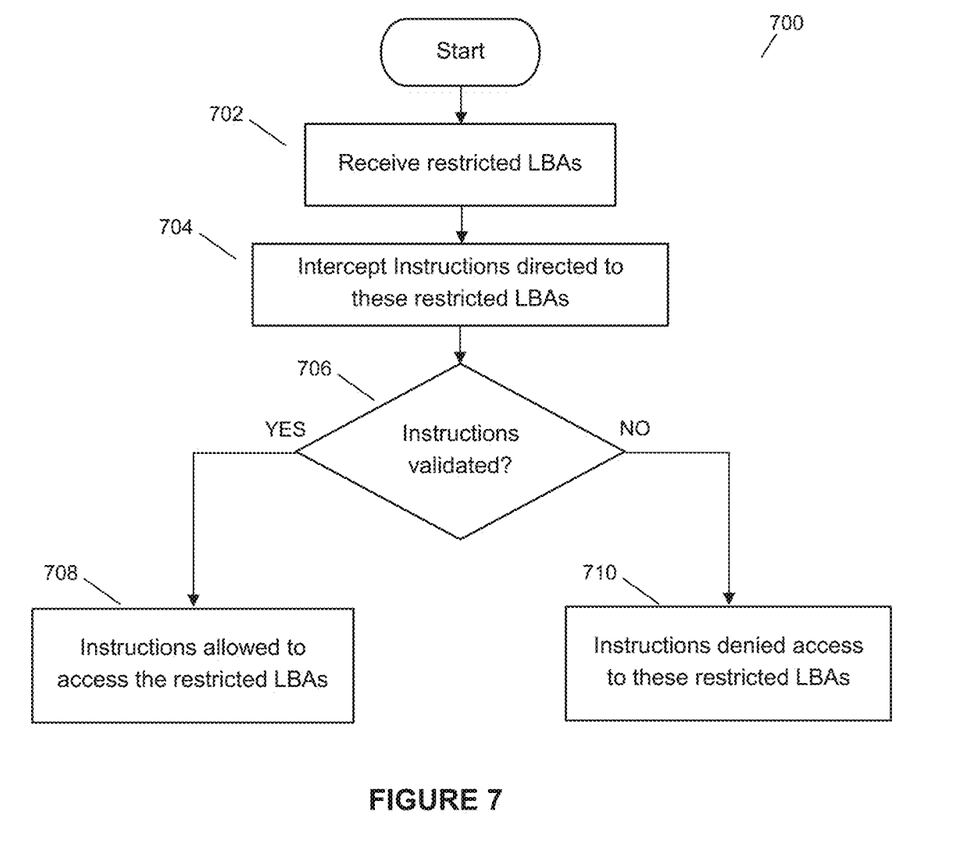
FIG. 7 illustrating a flow chart of a process for accessing restricted logical block addresses (LBAs) in a storage device in accordance with embodiments of the invention.

FIG. 7 illustrates process 700 for restricting access to restricted LBAs. Process 700 begins at step 702 whereby process 700 first receives a list of restricted LBAs. Process 700 first adds this list of restricted LBAs into a protected area within the storage device. At step 704, process 700 is then configured to intercept any instructions directed to these restricted LBAs. Once the instructions are intercepted, process 700 then determines at step 706 whether the instructions are valid and/or authorized instructions. If process 700 determines that the instructions are valid, process 700 allows the instructions to access the restricted LBAs. Conversely, if process 700 determines that the instructions are not valid, process 700 will proceed to step 710 instead. At this step, the instructions will be denied access to the restricted LBAs and no further action will be allowed to take place.

Numerous other changes, substitutions, variations and modifications may be ascertained by the skilled in the art and it is intended that the present invention encompass all such changes, substitutions, variations and modifications as falling within the scope of the appended claims.

The invention claimed is:

1. A module for authenticating data transfer between a storage device and a host device, the module comprising:
   a processing unit; and
   a non-transitory media readable by the processing unit, the media storing instructions that when executed by the processing unit cause the processing unit to:
      generate a digital signature for the storage device and the host device based on a unique number associated with the storage device and a unique device identity associated with the host device, wherein the unique number is provided within a secure crypto-processor in the storage device;
      determine if the digital signature has been written into a blockchain;
      allow encrypted data transfer between the storage device and the host device when it is determined that the digital signature matches a digital signature written into the blockchain; or
      prevent data transfer between the storage device and the host device when it is determined that the digital signature does not match a digital signature written into the blockchain;
      receive, from an authorized application provided in the host device, restricted logical block addresses (LBAs);
      intercept instructions from the host device to access the restricted LBAs; and
      allow the intercepted instructions to access to the restricted LBAs when the instructions have been validated by the module, wherein the instructions are signed by the authorized application using a public key of the storage device and are validated by the module using a private key of the storage device.

2. The module according to claim 1 wherein the instruction to prevent data transfer between the storage device and the host device further comprises instructions that when executed by the processing unit cause the processing unit to:
   write the digital signature into the blockchain when a pairing instruction is received from an authorized application provided in the host device; and
   allow encrypted data transfer between the storage device and the host device when the digital signature has been written into the blockchain.

3. The module according to claim 1 further comprising instructions that when executed by the processing unit cause the processing unit to:
   generate, after a random period of time has passed, another digital signature for the storage device and the host device based on the unique number associated with the storage device and the unique device identity associated with the host device;
   determine if the another digital signature matches with the digital signature that has been written into the blockchain;
   allow encrypted data transfer between the storage device and the host device when it is determined that the another digital signature matches the digital signature written into the blockchain; or
   prevent data transfer between the storage device and the host device when it is determined that the another digital signature does not match the digital signature written into the blockchain.

4. The module according to claim 1, wherein the instructions to generate the digital signature comprises instructions for directing the processing unit to generate the digital signature based on a session key of a Pretty-Good-Privacy (PGP) hybrid cryptosystem.

5. The module according to claim 4 wherein the instructions to allow encrypted data transfer between the storage device and the host device comprises instructions for directing the processing unit to:
   encrypt, using public-key cryptography, the PGP session key;
   store the encrypted PGP session key in secure locations at the storage device and the host device; and
   encrypt all data exchanged between the storage device and the host device using the PGP session key.

6. The module according to claim 1, wherein the instructions to generate the digital signature comprises instructions for directing the processing unit to:
   hash a combination of the unique number associated with the storage device and the unique device identity associated with the host device to generate a hashed message h;
   converting, using a Boneh-Lynn-Shacham (BLS) signature scheme, the hashed message h into a BLS signature $\sigma$; and
   using the BLS signature $\sigma$ as the digital signature.

7. The module according to claim 1, wherein the blockchain comprises a private distributed database system provided within the host device.

8. A method for authenticating data transfer between a storage device and a host device comprising:
   generating, using a module, a digital signature for the storage device and the host device based on a unique number associated with the storage device and a unique device identity associated with the host device, wherein the unique number is provided within a secure crypto-processor in the storage device;
   determining, using the module, if the digital signature has been written into a blockchain; allowing, using the module, encrypted data transfer between the storage device and the host device when it is determined that the digital signature matches a digital signature written into the blockchain; or
   preventing, using the module, data transfer between the storage device and the host device when it is determined that the digital signature does not match a digital signature written into the blockchain; receiving, using the module, from an authorized application provided in the host device, restricted logical block addresses (LBAs);
   intercepting, using the module, instructions from the host device to access the restricted LBAs; and
   allowing, using the module, the intercepted instructions to access to the restricted LBAs when the instructions have been validated by the module, wherein the instructions are signed by the authorized application using a public key of the storage device and are validated by the module using a private key of the storage device.

9. The method according to claim 8 wherein the step of preventing data transfer between the storage device and the host device further comprises the steps of:
   writing, using the module, the digital signature into the blockchain when a pairing instruction is received from an authorized application provided in the host device; and
   allowing, using the module, encrypted data transfer between the storage device and the host device when the digital signature has been written into the blockchain.

10. The method according to claim 8 further comprising the steps of:
    generating, using the module, after a random period of time has passed, another digital signature for the storage device and the host device based on the unique number associated with the storage device and the unique device identity associated with the host device;
    determining, using the module, if the another digital signature matches with the digital signature that has been written into the blockchain;
    allowing, using the module, encrypted data transfer between the storage device and the host device when it is determined that the another digital signature matches the digital signature written into the blockchain; or
    preventing, using the module, data transfer between the storage device and the host device when it is determined that the another digital signature does not match the digital signature written into the blockchain.

11. The method according to claim 8, wherein the step of generating the digital signature comprises generating the digital signature based on a session key of a Pretty-Good-Privacy (PGP) hybrid cryptosystem.

12. The method according to claim 11 wherein the step of allowing encrypted data transfer between the storage device and the host device comprises the steps of:
    encrypting, using the module and using public-key cryptography, the PGP session key; storing, using the module, the encrypted PGP session key in secure locations at the storage device and the host device; and
    encrypting, using the module, all data exchanged between the storage device and the host device using the PGP session key.

13. The method according to claim 8, wherein the step of generating the digital signature comprises the steps of:
    hashing, using the module, a combination of the unique number associated with the storage device and the unique device identity associated with the host device to generate a hashed message h;
    converting, using the module and using a Boneh-Lynn-Shacham (BLS) signature scheme, the hashed message h into a BLS signature $\sigma$; and
    using the BLS signature $\sigma$ as the digital signature.

14. The method according to claim 8, wherein the blockchain comprises a private distributed database system provide within the host device.

* * * * *